United States Patent
Amashta et al.

(10) Patent No.: US 12,182,550 B2
(45) Date of Patent: Dec. 31, 2024

(54) SYSTEMS AND METHODS FOR CASCADING STYLE SHEETS IN NATIVE MOBILE APPLICATIONS

(71) Applicants: Charles Amashta, Leander, TX (US); Jose Gabriel Llanes Charris, Santa Marta (CO)

(72) Inventors: Charles Amashta, Leander, TX (US); Jose Gabriel Llanes Charris, Santa Marta (CO)

(73) Assignee: DO GENIUS ON, LLC, Leander, TX (US)

(*) Notice: Subject to any disclaimer, the term of this patent is extended or adjusted under 35 U.S.C. 154(b) by 0 days.

(21) Appl. No.: 17/689,804

(22) Filed: Mar. 8, 2022

(65) Prior Publication Data
US 2022/0283791 A1  Sep. 8, 2022

Related U.S. Application Data

(60) Provisional application No. 63/158,094, filed on Mar. 8, 2021.

(51) Int. Cl.
*G06F 8/41* (2018.01)
(52) U.S. Cl.
CPC .................. *G06F 8/427* (2013.01)
(58) Field of Classification Search
CPC ........................................ G06F 8/427
USPC ................................ 717/120–143
See application file for complete search history.

(56) References Cited

U.S. PATENT DOCUMENTS

| | | | | |
|---|---|---|---|---|
| 7,168,035 B1* | 1/2007 | Bell | ...... | G06F 40/143 715/745 |
| 7,985,598 B2* | 7/2011 | Tabata | ...... | B82Y 30/00 422/561 |
| 8,181,104 B1* | 5/2012 | Helfand | ...... | G06F 40/143 715/236 |
| 8,346,784 B1* | 1/2013 | Potekhin | ...... | H04L 67/561 707/751 |
| 8,495,171 B1* | 7/2013 | Potekhin | ...... | G06F 16/957 709/217 |

(Continued)

OTHER PUBLICATIONS

Mazinanian et al, "Discovering Refactoring Opportunities in Cascading Style Sheets", ACM, pp. 496-506 (Year: 2014).*

(Continued)

*Primary Examiner* — Anil Khatri
(74) *Attorney, Agent, or Firm* — Newman Jones, PLLC

(57) ABSTRACT

Mobile cascading style sheets (MCSS) are provided for use in conjunction with native mobile applications. The MCSS framework/library allows a developer to use the full potential and capabilities of the native software development kit (SDK) via a form of cascading style-sheet (CSS) code to design, build, and deploy an entire native application in much the same way a website is built with CSS. To achieve this, the system includes a compiler (consisting of an interpreter module and an applier module) configured to convert MCSS code to native SDK instructions, as described in further detail below. In this way, by simplifying the coding process, the present invention provides substantial savings in terms of both time and cost with respect to developing new applications and maintaining/updating existing applications.

15 Claims, 5 Drawing Sheets

(56) References Cited

U.S. PATENT DOCUMENTS

Figure 1:
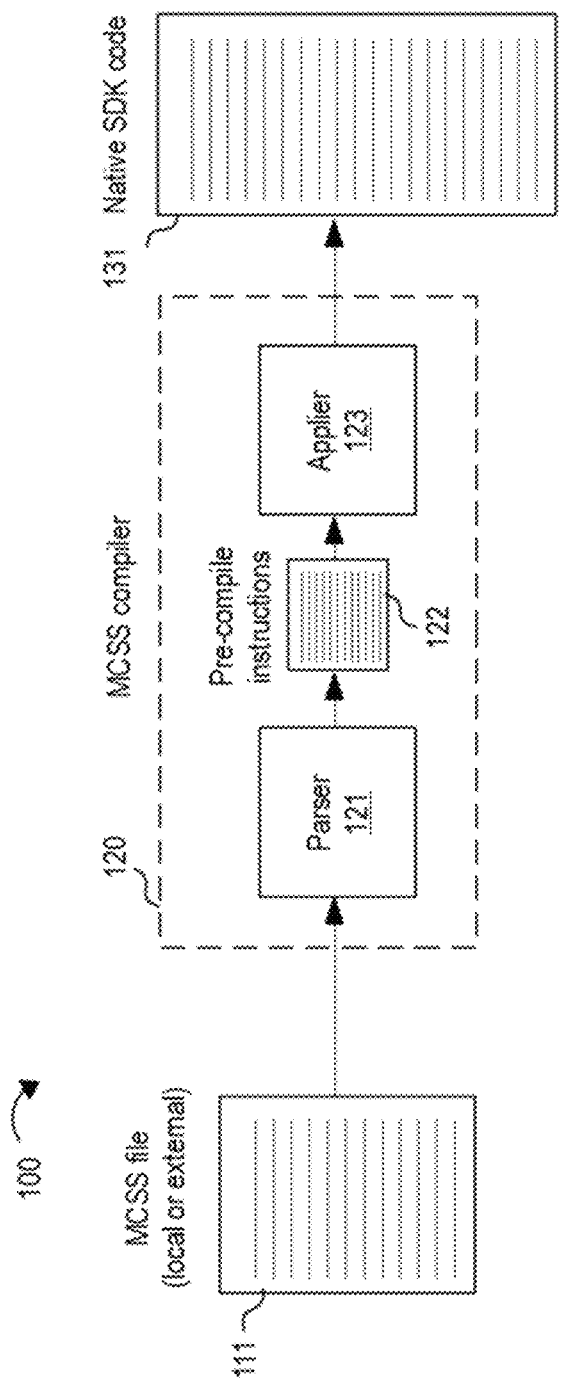

| | | | |
|---|---|---|---|
| 8,694,968 B2* | 4/2014 | Eteminan | G06F 8/71 |
| | | | 717/124 |
| 8,819,624 B2* | 8/2014 | Hou | G06F 9/455 |
| | | | 717/109 |
| 8,819,638 B2* | 8/2014 | Sharma | G06F 11/3688 |
| | | | 717/124 |
| 9,727,448 B1* | 8/2017 | Seibert, Jr. | G06F 11/3676 |
| 10,025,694 B1* | 7/2018 | Cattan | G06F 11/302 |
| 10,235,035 B2* | 3/2019 | Karunamuni | G06F 3/0488 |
| 10,769,715 B1* | 9/2020 | Coady | H04L 67/02 |
| 11,425,002 B1* | 8/2022 | Miocevic | G06F 9/44542 |
| 2014/0282398 A1* | 9/2014 | Podolyak | G06F 8/36 |
| | | | 717/121 |
| 2016/0092176 A1* | 3/2016 | Straub | G06F 8/34 |
| | | | 717/107 |

OTHER PUBLICATIONS

Bosch et al, "Automated Refactoring for Size Reduction of CSS Style Sheets", ACM, pp. 13-16 (Year: 2014).*

Alves-Oliveira et al, "FLEX-SDK: An Open-Source Sofware Development Kit for Creating Social Robots", ACM, pp. 1-10 (Year: 2022).*

Battaglia et al, "An Open and Portable Software Development Kit for Handheld Devices with Proprietary Operating Systems", IEEE, pp. 2436-2444 (Year: 2009).*

Frantz et al, "A Software Development Kit to Implement Integration Solutions", ACM, pp. 1647-1652 (Year: 2012).*

Reiss et al, "Simplifying Data Integration: The Design of the Desert Software Development Environment", IEEE, pp. 398-407 (Year: 1996).*

* cited by examiner

SYSTEMS AND METHODS FOR CASCADING STYLE SHEETS IN NATIVE MOBILE APPLICATIONS

CROSS-REFERENCE TO RELATED APPLICATIONS

This application claims priority to U.S. Provisional Patent Application No. 63/158,094, filed Mar. 8, 2021, the entire contents of which are hereby incorporated by reference.

TECHNICAL FIELD

The present invention relates, generally, to mobile application development and, more particularly, to the use of a form of cascading style sheets (CSS) in connection with native mobile applications.

BACKGROUND

Recent years have seen a dramatic increase in the use of mobile computing devices, and this trend has been accompanied by a similar increase in mobile app development. Currently, there are two major mobile platforms: iOS and Android, each having their own associated software stacks, development environments, libraries, and app stores. In order to maximize revenue and market-share, developers prefer to offer mobile applications that run on both platforms.

Unfortunately, targeting multiple platforms for a single application can be extremely costly and time-consuming. Providing an application with a consistent UX/UI across platforms (given significant differences in graphics and animation) requires experienced developers in both iOS (Swift/Objective-C) and/or Android (Java/Kotlin). Furthermore, fixing errors, making improvements, providing maintenance, and updating an application at the code level for deployment on the respective app stores is extremely challenging. Finally, it can take a significant length of time for end-users to download new version and updates of a native app from app stores.

Currently known methods for addressing these problems are unsatisfactory in a number of respects. For example, it is possible for developers to deploy a web application—i.e., a website (utilizing, for example, HTML+CSS+JS) that runs within the mobile device browser and generally "feels" like a traditional app. However, these types of apps are served through the internet, and cannot be downloaded and installed on the mobile device in the traditional manner.

Such web apps have a number of disadvantages. For example, they are inaccessible through app stores, they generally exhibit slower operating speed, and they have little or no access to the native capabilities of the device. Furthermore, web apps do not function without an internet connection, they are subject to the operating capabilities of the browser (which may change without notice), they only appear on the home screen if a user bookmarks them through their browser, and they do not run well on older devices and browsers.

Alternatively, applications may be deployed as hybrid apps. These applications are essentially web apps that operate within a native app shell. Such apps can be download from an app store and installed locally so that they can connect to capabilities provided by the mobile platform through a browser that is embedded in the application. Hybrid apps have a number of disadvantages. For example, their graphical appearance and behavior may vary from platform to platform, they tend to be slower than equivalent native apps, and they must be tested on a range of hardware platforms to ensure proper operation.

Furthermore, hybrid apps remain—at their core—simply websites. As a result, they require a constant internet connection to deliver their full range of user features. In addition, due to the nature of their architecture, hybrid apps must rely on plug-ins and other extensions to access the built-in features of the hardware target. Such plug-ins and extensions can be out-of-date or unreliable. Finally, the user experience of a hybrid applications is often a compromise between iOS and Android features: if the developer leans too heavily on Android, the experience will be degraded for iOS users, and vice versa.

Systems and methods are therefore needed to overcome these and other limitations of prior art mobile development frameworks.

SUMMARY OF THE INVENTION

Various embodiments of the present invention relate to the use of mobile cascading style sheets (MCSS) in conjunction with native mobile applications. In contrast with hybrid and web app technologies described above, the novel MCSS framework/library described herein allows a developer to use the full potential and capabilities of the native software development kit (SDK) via a form of cascading style-sheet (CSS) code (referred to herein as mobile CSS, or "MCSS") to design, build, and deploy an entire native application in much the same way a website is built with CSS. To achieve this, the system includes a compiler (consisting of an interpreter module and an applier module) configured to convert MCSS code to native SDK instructions, as described in further detail below. In this way, by simplifying the coding process, the present invention provides substantial savings in terms of both time and cost with respect to developing new applications and maintaining/updating existing applications.

BRIEF DESCRIPTION OF THE DRAWING FIGURES

The present invention will hereinafter be described in conjunction with the appended drawing figures, wherein like numerals denote like elements, and:

FIG. 1 is a conceptual block diagram illustrating an overview of a mobile cascading style sheets ("MCSS") in accordance with various embodiments of the invention FIG. 2 is an example of XML (top) and Java (bottom) code snippets required to apply a gradient to a view background using XML and Java (for the Android platform); and FIGS. 3-10 illustrate various API code snippets useful in understanding one embodiment of the invention (i.e., in the context of a Swift framework).

DETAILED DESCRIPTION OF PREFERRED EXEMPLARY EMBODIMENTS

The present subject matter relates to improved systems and methods for mobile application development using mobile cascading style sheets ("MCSS"). As a preliminary matter, it will be understood that the following detailed description is merely exemplary in nature and is not intended to limit the inventions or the application and uses of the inventions described herein. Furthermore, there is no intention to be bound by any theory presented in the preceding background or the following detailed description. In the interest of brevity, conventional techniques and components related to software development and design, software architecture, and the operation of mobile devices may not, and need not, be described in detail herein.

Referring to the conceptual block diagram of FIG. 1, an overview of a system in accordance with various embodiments of the invention will now be described. In general, MCSS system 100 includes an MCSS compiler 120 configured to receive an MCSS file 111 (which may be local to the application environment or externally hosted) and then convert that MCSS file 111 to native SDK code 131 (the nature of which will vary depending upon the software platform used for development). MCSS compiler, in this embodiment, includes two primary components: a parser 121, and an applier 123.

Parser 121 is configured to receive the MCSS file 111 and generate a pre-compiled set of instructions 122. The pre-compiled set of instructions 122 will vary, depending upon the nature of the platform being targeted, as is known in the art. These instructions 122 are then read by applier 123, which transforms the appearance of any views and components within the view to match the instructions specified in MCSS 111.

Applier 123 includes several functions that are configured to take any component of a view and then edit each attribute of those components as if the developer were editing them natively, thereby converting the MCSS file 111 into native code—e.g., Swift/Objective-C for iOS and Java/Kotlin for Android. The applier is designed to be very robust, and is capable of editing any available graphical components and applying any attributes required for the desired design.

Native SDKs generally require very complex and verbose instructions to edit graphical objects within a native app. Such attributes include colors, themes, borders, shadows, fonts, etc., and may vary depending upon the app that is being modified. It will be apparent, then, that the novel MCSS framework described herein greatly simplifies this process: allowing the developer, through the use of an MCSS file with intuitive syntax, to build cross-platform applications with a consistent UX and graphical vocabulary.

In accordance with the present invention, the developer simply downloads the MCSS framework (including compiler 120 and any associated libraries and executables) and installs the appropriate files within the developer's integrated development environment (IDE), as is well known in the art. The developer then creates the application using standard software development processes, utilizing the MCSS system to specify the look and feel of components in the application. When compiled and built, the MCSS file is parsed and applied to produce the native code, as described above.

As mentioned above, the applicable MCSS file may reside in the application package itself (e.g., part of the application's manifest) or may be hosted remotely (e.g., within a cloud database and accessible via a known URL). When the MCSS file is hosted externally, the present system allows the developer to make changes, fix errors, provide updates, and maintain all components of the native app's view in real-time without requiring upload of a new version of the application to the app store. That is, these changes are automatically implemented without requiring action on the part of the user; the changes are reflected in the application the next time it runs and accesses the MCSS files.

The use of the MCSS system described herein greatly simplifies the development process, and also reduces the amount of code required to achieve a particular result.

Figure 2:
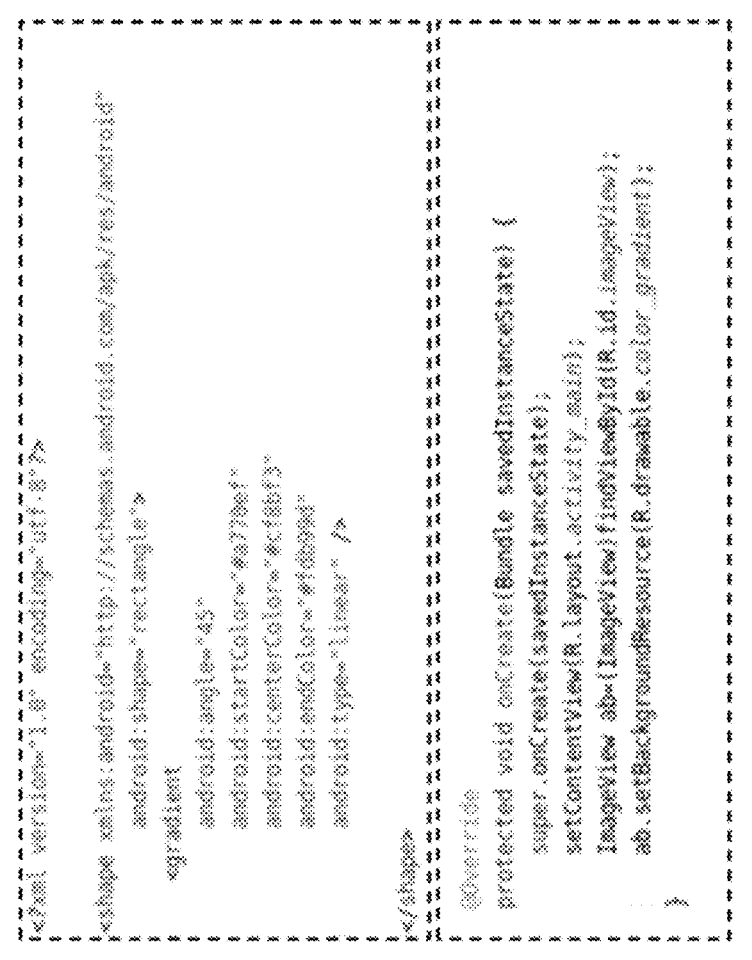

FIG. 2 is an example of the XML (top) and Java (bottom) code required to apply a gradient to a view background using XML and Java (for the Android platform).

In contrast, using the present invention, to apply the same gradient to this view (in a platform-independent way), the developer simply needs to add a single instruction in a selector referencing the components requiring the gradient:

```
background-image: linear-gradient (45deg, #a770ef,#cf8bf3,#fdb99d);
```

That is, approximately nine lines of XML and five lines of Java are replaced by a single MCSS expression. The results are comparable for the equivalent iOS/Swift code. Note also that this change can be applied to all views at the same time (i.e., instead of requiring the same change to be implemented view-by-view).

The MCSS file itself may be implemented using a variety of syntaxes. In one embodiment, described in further detail in, the MCSS syntax a rule-set that consists of a selector and a declaration block containing a pair of properties and values, e.g.:

selector{property1:value1; property2:value2;}

MCSS inherits much of the standard CSS syntax (specified in the current CSS specification), except that the selector names correspond to mobile app components (e.g., buttons, text fields, etc.) rather than DOM elements. As in CSS, selectors can locate elements based on name, ID, or class. In general, the names of the components correspond to the names of the applicable classes in Java or Swift (e.g., View, Button, Label, RadioButton, etc.).

The MCSS syntax may provide a variety of selectors, including simple selectors, grouping selectors, combinatory selectors, and universal selectors. As with CSS, the simple selectors may find elements based on name, ID or class: by indicating the name of a component: button{ . . . }, by indicating a class: .primary{ . . . }, by indicating an ID: #signup-button{ . . . }, or by indicating name and class at the same time: button.primary{ . . . }. The grouping selector selects all native elements with the same style definitions, in which case the selector to be grouped must be separated by a comma, and each selector grouped will adopt the style applied in the selector. A combinator selector consists of two or more simple selectors joined by a combinator operator, including: a descendant selector (space), which matches the second selectors inside of the first selector even if the first component is not the direct ancestor of the second; a child selector (>), which matches the second selectors inside of the first selector being the second component the direct child of the first component; an adjacent sibling selector (+), which separates two selectors and matches the second element only if it immediately follows the first element, and both are children of the same parent element; a general sibling selector (~), which matches all iterations of the second element that are following the first element (though not necessarily immediately), and are children of the same parent element. The universal selector (*) select all elements, and allows the developer to combine the universal selector with other selector using combinators.

A variety of MCSS component types names may be provided. Preferably, the names of the components match corresponding classes in Java or Swift (omitting the UI prefix). For example, the following names can be used in a simple selector to find all elements of the specified type: View, Button, Label, TextField, TextView, Scroll View, Table, TableCell, Collection, CollectionCell, WebView, ImageView, Slider, Switch, Picker, Stepper, SegmentedControl, ProgressIndicator, PageControl, SplitView, SearchBar, Map, NavigationBar, EditMenu, StatusBar, TabBar, Toolbar, RefreshContentControl, ActionSheet, ActivityView, Alert, Page, Popover, CalendarView, CheckBox, CheckedTextView, Chronometer, RadioGroup, RadioButton, Magnifier, and the like.

MCSS provides a range of properties similar to CSS, including, for example: background (color|image), background-color (color), background-image (url|name of file|linear-gradient|system-icon), border (none|width|color), border-width (px), border-color (color), border-radius (px|%), visibility (visible|hidden), box-shadow:(none|h-offset v-offset blur spread color), opacity: (0-1|%), line-height (px), font (name, size), font-size (px), font-weight (100-800|ultralight|light|thin|normal|medium|semibold|bold-|heavy|black), -mcss-font-name (String), text-align (natural-|center|left|right|justify), text-transform (uppercase|lowercase|capitalize), color (color name|RGB|RGBA|HSL|HSLA|HEX3|HEX4 HEX6|HEX8), overflow (hidden|visible), -mcss-text (string), -mcss-minimum-font-scale (0-1|%), -mcss-html-content (HTML CODE), -mcss-max-lines (unlimited|number), -mcss-placeholder-color (color), -mcss-placeholder-text (String), and -mcss-icon-image(url|name of file|linear-gradient|system icon). To some properties, an index can be appended to indicate the position of the element you to be accessed, e.g., -mcss-text-i, -mcss-icon-image-i. MCSS also provides a variety of color formats (HSL, RGB, etc.) and color names, as are known in the art.

In accordance with various embodiments of the present invention, a functional framework is also provided that allows developers to build and add functionality in the form of additional libraries, much in the same way that JQuery, React, and other such frameworks can be used to extend the functionality of websites. This framework consists of a file in which the developer specifies component behaviors with a trigger that is called within the native app code. For example, when a registered trigger is executed, the system may perform an action such as loading a specific view located in the story board, creating new components and adding them to a new view or an existing view, modifying or changing the MCSS style of a component, applying animations to a component, making changes to a form (e.g., deleting fields, adding fields, etc.).

The systems and methods of the present invention may be used in connection with any IDE now known or later developed, and may also be used in connection with a variety of software platforms. That is, the invention is not limited to Android or iOS platforms.

While the invention may be implemented in a variety of ways, the following description and associated figures (of exemplary code snippets) together illustrate a non-limiting example of just one implementation, including a set of public functions applicable to the Swift framework (and described in the context of the XCode IDE).

Initialization Method (MCSS.shared.initialize(withToken: String)).

Figures 3, 4, 5, 6:
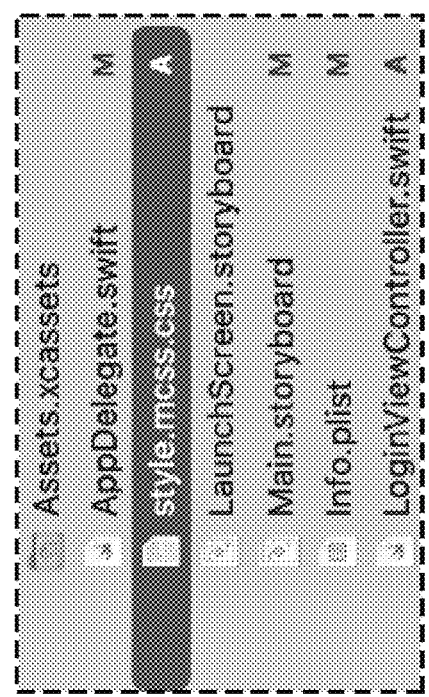

An initialization method in accordance with one embodiment requires a key (obtained, for example, at getmcss.com or other online host) that is preferably provided to validate the access to other framework functions. This method should be called in application first, before other MCSS functions, as illustrated in FIG. 3.

Use Theme (MCSS.shared.useTheme(_:String)).

This optional method may be called adding the name of one of the available themes to be used. After identifying the components in the app by providing classes and IDs, the app will adopt the design specified in the selected theme. This method is preferably called in the application (_:didFinishLaunchingWithOptions:) after MCSS.shared.initialize (withToken: String), as shown in FIG. 4.

Add StyleSheet from File (MCSS.shared.addStyleSheet (fromFile:String). The MCSS file containing the application style instructions should be added to project. In this regard, the name of the MCSS file is sent as a parameter as shown in FIG. 5. To add the MCSS file to the project, the user may select within the user interface menu the option File/new/file . . . select an empty file, and add a name with the proper extension (e.g., ".css") or drag and drop the MCSS file to the project. The user is presented the option to 'copy items if needed'. This method may be called multiple times for multiple MCSS files, and all MCSS files will be combined. This method is preferably called in application (_:didFinishLaunchingWithOptions:) after MCSS.shared.initialize (withToken:String) as shown in FIG. 6.

Add StyleSheet from URL (MCSS.shared.addStyleSheet (fromURL:String)).

Figures 7, 8, 9:
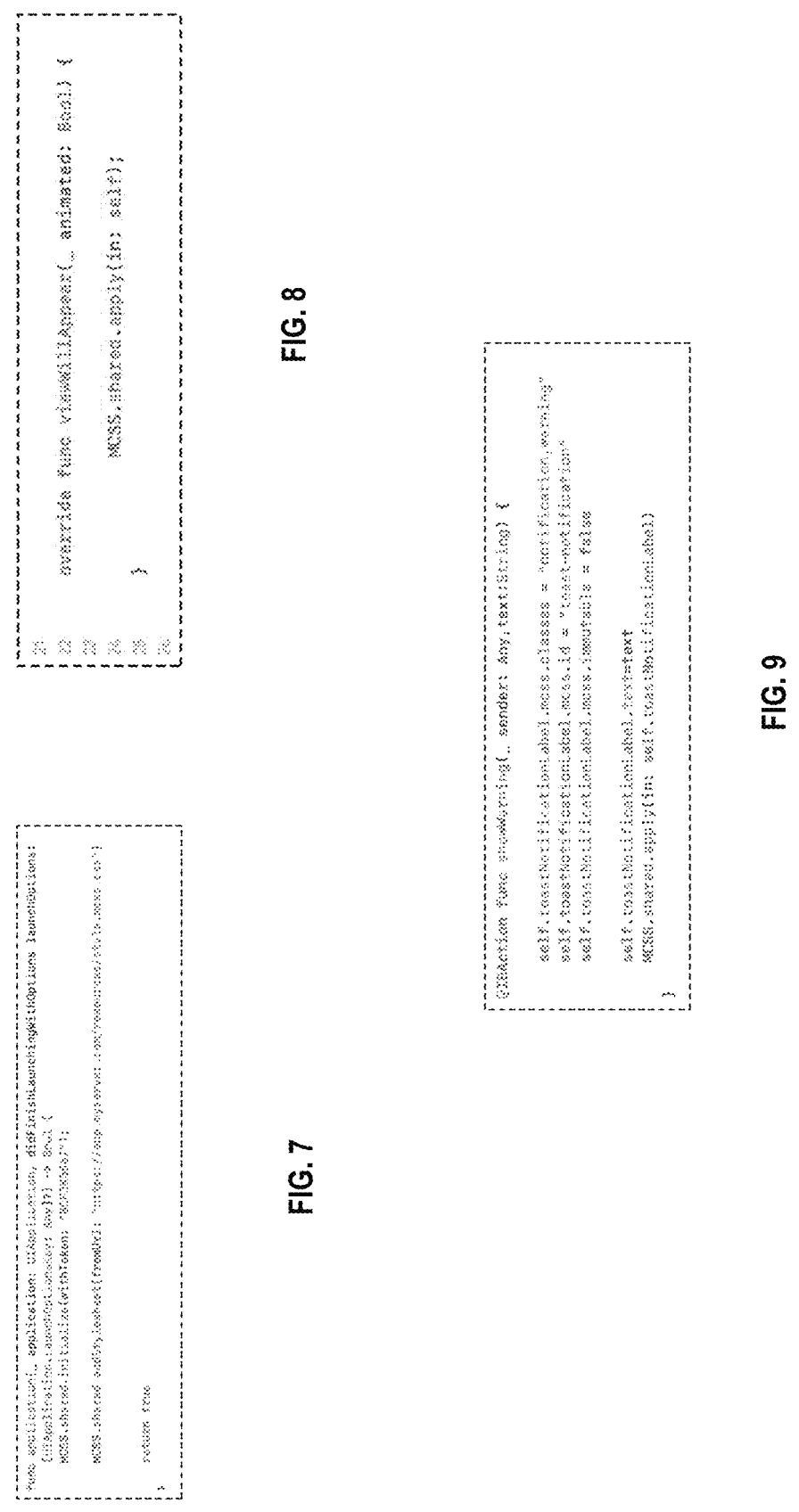

With this method, the project can be linked with an external URL where the MCSS files are hosted (e.g. https://api.myserver.com/resources/style.mcss.css). This method may be called multiple times with multiple MCSS files, and all MCSS files will be combined. This method is preferably called in application (:didFinishLaunchingWithOptions:) after MCSS.shared.initialize(withToken: String) as shown in FIG. 7.

Apply in ViewController (MCSS.shared.apply(in:UIViewController).

This method can be used to recursively find all components inside a ViewController (including the tab-bar and navigation bar), and add the corresponding design based on the MCSS rules provided in the MCSS files, the developer can then indicate as a parameter the main view of a view controller and the Apply function will access all of the components. The developer may also send particular components as buttons or textviews. It is recommended that this function be used in viewWillAppear as shown in FIG. 8.

Apply in View (MCSS.shared.apply(in:UIView)).

This method can recursively find all components inside a view and add the corresponding design based on the MCSS rules provided in the MCSS files. Normally, the developer can indicate as a parameter the main view of a view controller and the Apply function will access all of other components. Depending on the applicable requirements, the developer may send particular components as buttons or textview.

Public Methods Added by Extension.

Figure 10:
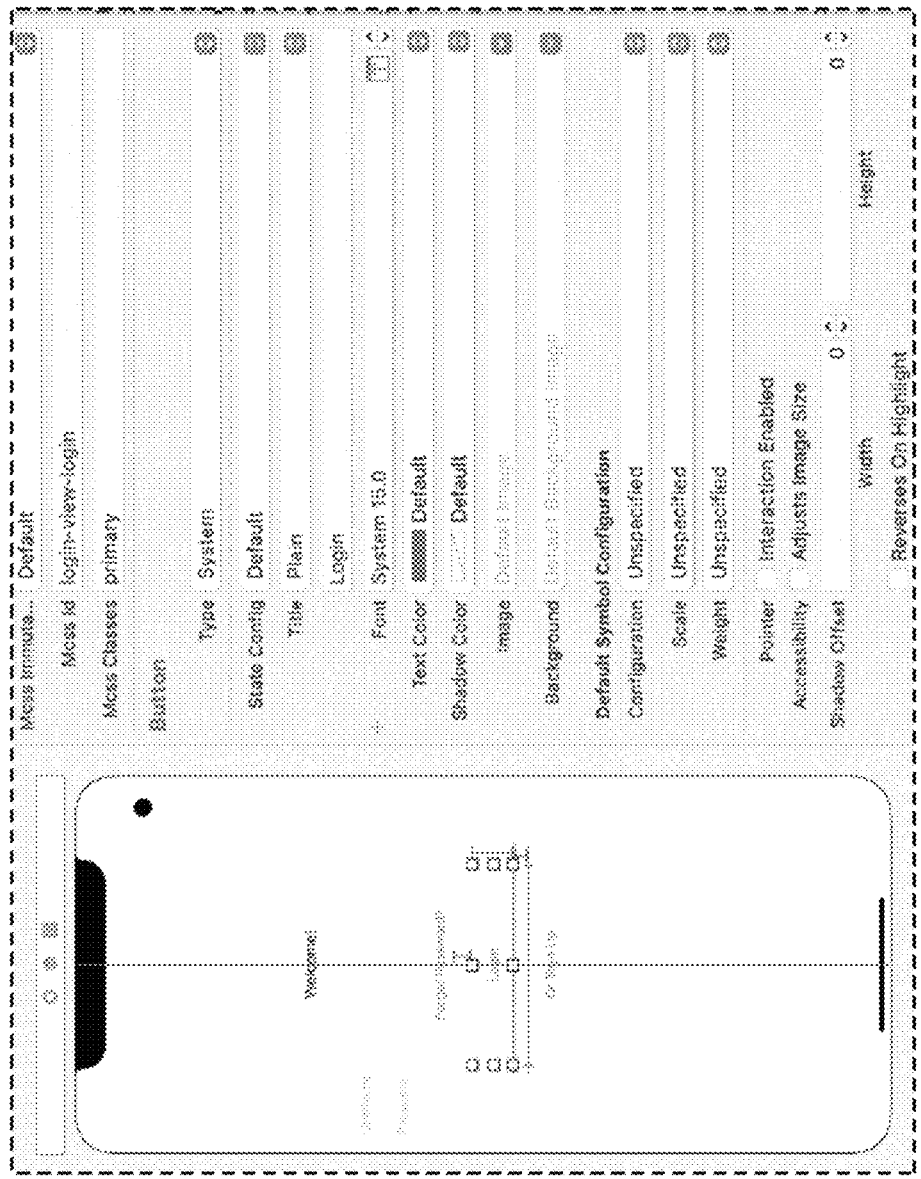

In accordance with various embodiments, a range of properties can be accessed as a property of any UIComponent, e.g. UIButton, UIView, UITextField, UITextView, UITable, UIPicker, or UISwitch. For example, "view.mcssid:String"_adds a unique ID to the component (e.g., mybutton.css.id="signup-button"), "view.mcss-.classes:String" adds to the component one or more classes separated by comma (e.g., mybutton.css.id="primary, rounded, translucent"), "view.mcss.immutable:Boolean" sets component so it cannot be edited via MCSS even if the selectors in the MCSS files match with the component (see, e.g., FIG. 9.) If the user wishes to avoid using the functions provided above, the Interface Builder may be used to access the inspectable properties, as shown in FIG. 10.

While the examples shown above are described in the context of an iOS application, it will be appreciated that parallel functions may also be provided in the context of an Android build or any other mobile development environment.

Accordingly, what has been described above are various novel improvements to the process of mobile app development. The MCSS system allows the developer, through the use of an intuitive and simple MCSS file, to build complex, native cross-platform applications with a consistent UX and graphical vocabulary while at the same time allowing easy maintenance, updating, and deployment. The level of coding experience required by the developer is reduced, thereby also reducing both the time and cost necessary for development, maintenance, and updates.

In accordance with one embodiment, a software development system includes: a mobile cascading style-sheet (MCSS) compiler comprising a parser module and an applier module; wherein the parser module is configured to receive an MCSS file and convert the MCSS file to pre-compile instructions; and wherein the applier module is configured to convert the pre-compile instructions to native software development kit (SDK) code associated with a target platform, including transforming the appearance of any views and components to match the instructions specified in the MCSS file.

In accordance with another embodiment, a method for software development includes: providing mobile cascading style-sheet (MCSS) compiler comprising a parser module and an applier module; receiving, with the parser module, an MCSS file and convert the MCSS file configured to produce pre-compile instructions based on the MCSS file; converting, with the applier module, the pre-compile instructions to native software development kit (SDK) code associated with a target platform, including transforming the appearance of any views and components to match the instructions specified in the MCSS file.

Embodiments of the present disclosure may be described in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, field-programmable gate arrays (FPGAs), Application Specific Integrated Circuits (ASICs), logic elements, look-up tables, network interfaces, or the like, which may carry out a variety of functions under the control of one or more microprocessors or other control devices either locally or in a distributed manner.

In addition, those skilled in the art will appreciate that embodiments of the present disclosure may be practiced in conjunction with any number of systems, and that the systems described herein are merely exemplary embodiments of the present disclosure. Further, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the terms "module" or "controller" refer to any hardware, software, firmware, electronic control component, processing logic, and/or processor device, individually or in any combination, including without limitation: application specific integrated circuits (ASICs), field-programmable gate-arrays (FPGAs), dedicated neural network devices (e.g., Google Tensor Processing Units), electronic circuits, processors (shared, dedicated, or group) configured to execute one or more software or firmware programs, a combinational logic circuit, and/or other suitable components that provide the described functionality. The described functional modules may be implemented using virtual machine instances running on a dedicated server or on a cloud computing platform of the type known in the art.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A software development system comprising:
A mobile cascading style-sheet (MCSS) compiler comprising a parser module and an applier module;
wherein the parser module is configured to receive an MCSS file and convert the MCSS file to pre-compile instructions;
wherein the applier module is configured to convert the pre-compile instructions to native software development kit (SDK) code associated with a target platform, including transforming the appearance of any views and components to match the instructions specified in the MCSS file and
wherein the applier module is configured to take a component of a view and then edit each attribute of the component as if the developer were editing the component natively, thereby converting the MCSS file into native code.

2. The system of claim 1, wherein the MCSS file is stored in a server that is remote to the software development system and communicatively coupled via a network.

3. The system of claim 1, wherein the MCSS file is stored locally in an application package.

4. The system of claim 1, wherein the target platform is an Android platform.

5. The system of claim 1, wherein the target platform is an iOS platform.

6. A method for software development comprising:
providing mobile cascading style-sheet (MCSS) compiler comprising a parser module and an applier module;
receiving, with the parser module, an MCSS file and convert the MCSS file configured to produce pre-compile instructions based on the MCSS file;
converting, with the applier module, the pre-compile instructions to native software development kit (SDK) code associated with a target platform, including transforming the appearance of any views and components to match the instructions specified in the MCSS file, and
wherein the applier module is configured to take a component of a view and then edit each attribute of the component as if the developer were editing the component natively, thereby converting the MCSS file into native code.

7. The method of claim 6, wherein the MCSS file is stored in a server that is remote to the software development system and communicatively coupled via a network.

8. The method of claim 6, wherein the MCSS file is stored locally in an application package.

9. The method of claim 6, wherein the target platform is an Android platform.

10. The method of claim 6, wherein the target platform is an iOS platform.

11. Non-transitory media bearing computer readable software instructions configured to cause a processor to perform the steps of:
   receiving, with a parser module, an MCSS file and convert the MCSS file configured to produce pre-compile instructions based on the MCSS file;
   converting, with an applier module, the pre-compile instructions to native software development kit (SDK) code associated with a target platform, including transforming the appearance of any views and components to match the instructions specified in the MCSS file, and
   wherein the applier module is configured to take a component of a view and then edit each attribute of the component as if the developer were editing the component natively, thereby converting the MCSS file into native code.

12. The non-transitory media of claim 11, wherein the MCSS file is stored in a server that is remote to the software development system and communicatively coupled via a network.

13. The non-transitory media of claim 11, wherein the MCSS file is stored locally in an application package.

14. The non-transitory media of claim 11, wherein the target platform is an Android platform.

15. The non-transitory media of claim 11, wherein the target platform is an iOS platform.

\* \* \* \* \*